(Model.) 3 Sheets—Sheet 1.
J. H. PERRY & S. A. GOODMAN.
MEASURING INSTRUMENT.
No. 261,626. Patented July 25, 1882.
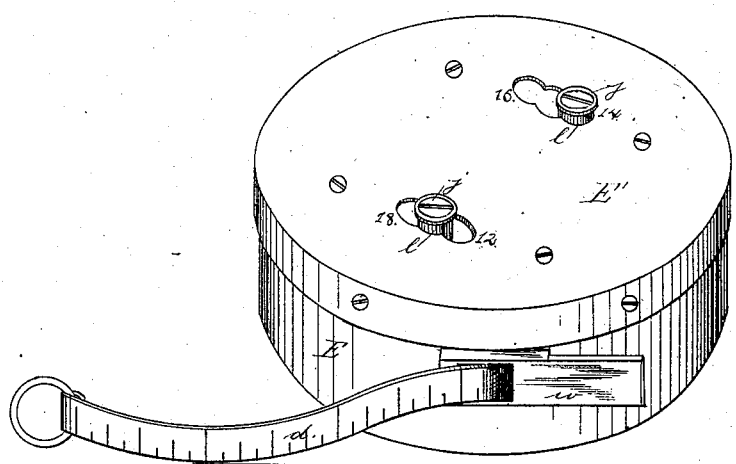
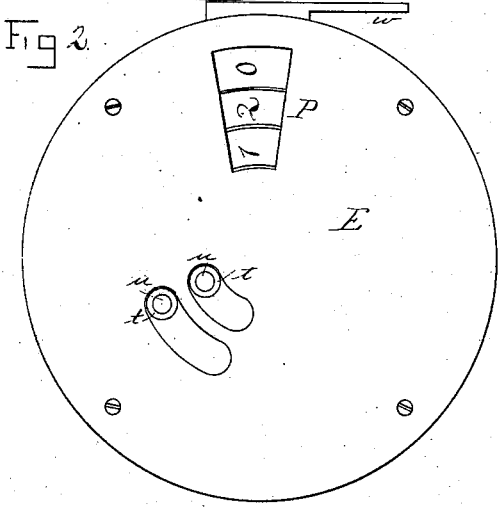
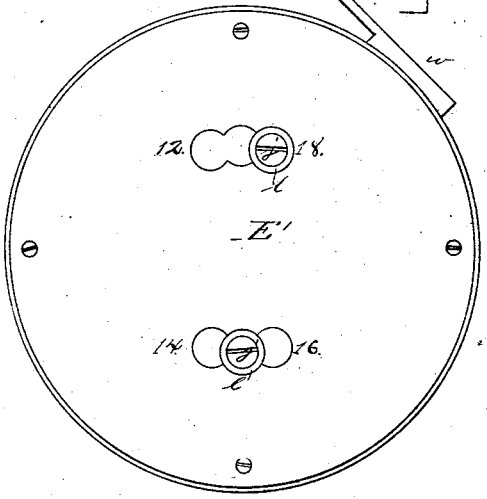
WITNESSES
F. W. Adams
F. W. Kaschagen
INVENTOR
Joseph H. Perry
Samuel A. Goodman
By Wm H Lotz
Attorney (Model.)

3 Sheets—Sheet 2.

J. H. PERRY & S. A. GOODMAN.
MEASURING INSTRUMENT.

No. 261,626.                    Patented July 25, 1882.

WITNESSES
J. W. Adams
F. W. Kasehagen.

INVENTOR
Joseph H. Perry
Samuel A. Goodman
By Wm H Lotz
Attorney (Model.) 3 Sheets—Sheet 3.

J. H. PERRY & S. A. GOODMAN
MEASURING INSTRUMENT.

No. 261,626. Patented July 25, 1882.

WITNESSES
F. W. Adams
F. W. Kaschagen

INVENTOR
Joseph H. Perry
Samuel A. Goodman
By Wm H Lotz
Attorney

UNITED STATES PATENT OFFICE.

JOSEPH H. PERRY AND SAMUEL A. GOODMAN, OF PIPER CITY, ILLINOIS.

MEASURING-INSTRUMENT.

SPECIFICATION forming part of Letters Patent No. 261,626, dated July 25, 1882.

Application filed March 11, 1882. (Model.)

*To all whom it may concern:*

Be it known that we, JOSEPH H. PERRY and SAMUEL A. GOODMAN, of Piper City, in the county of Ford and State of Illinois, have invented certain new and useful Improvements in Measuring-Instruments; and we do hereby declare that the following is a full, clear, and exact description thereof, reference being had to the accompanying drawings, and to the letters of reference marked thereon, which form a part of this specification.

This invention relates to measuring-instruments by which to register and estimate the superficial feet of lumber; and it consists in certain improvements in the construction and arrangement of the various parts of the device, as will be hereinafter described, and pointed out in the claims.

Figure 4:
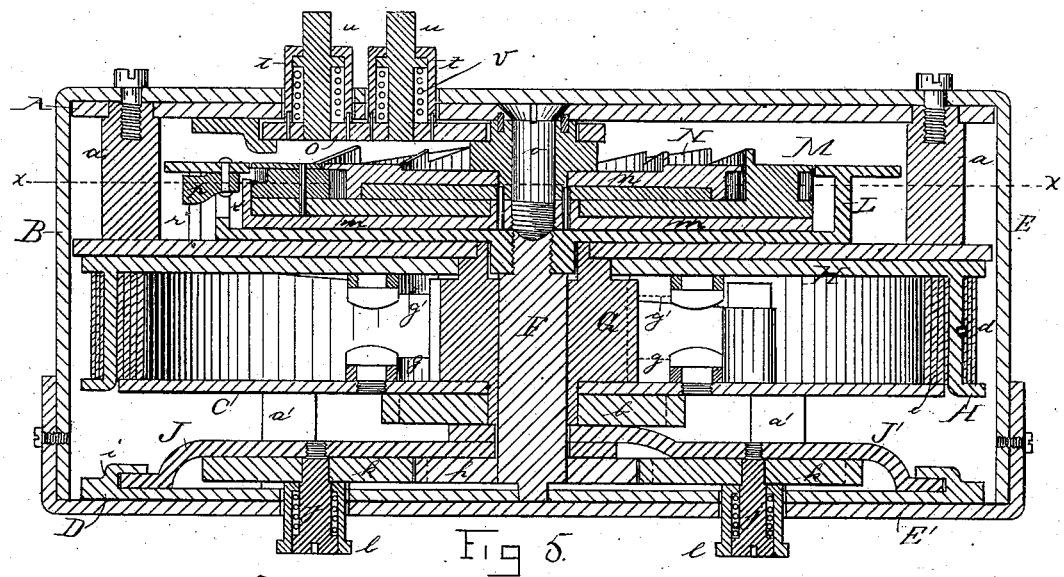
Figure 5:
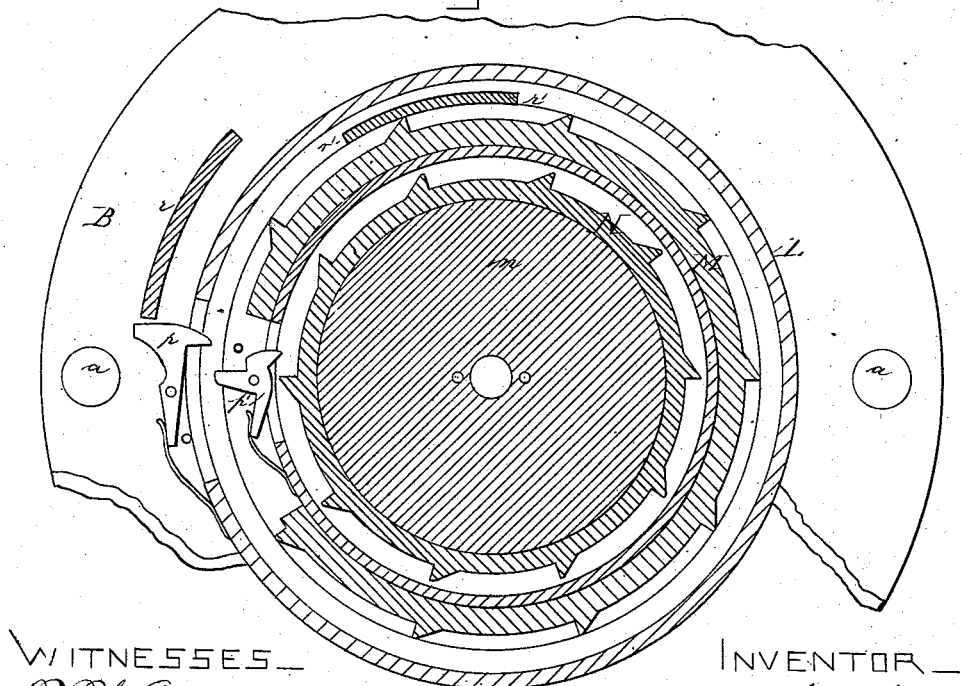
Figure 6:
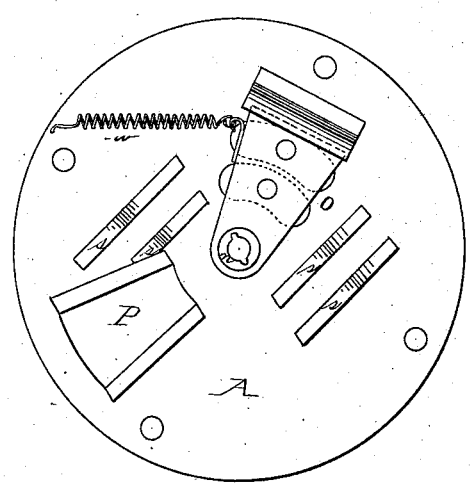
Figure 7:
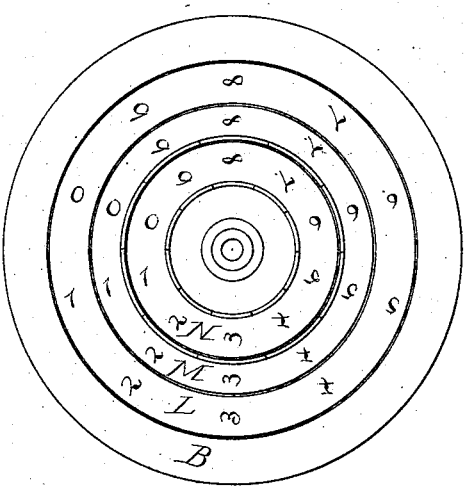
Figure 8:
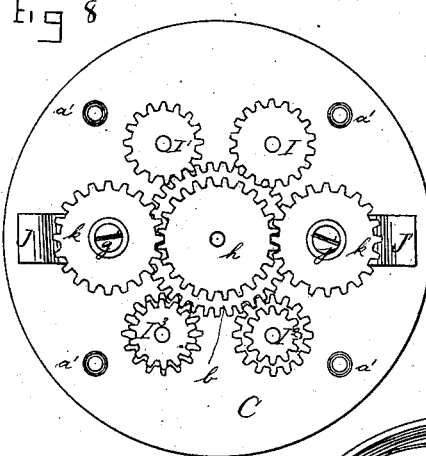
Figure 9:
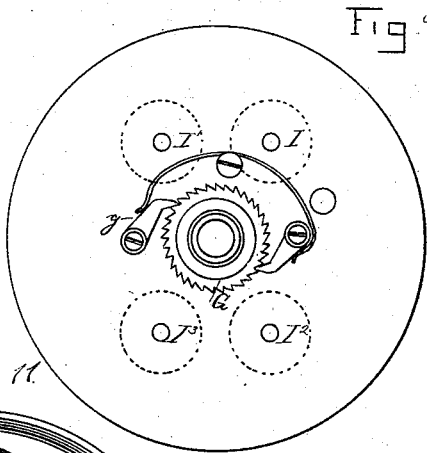
Figure 11:
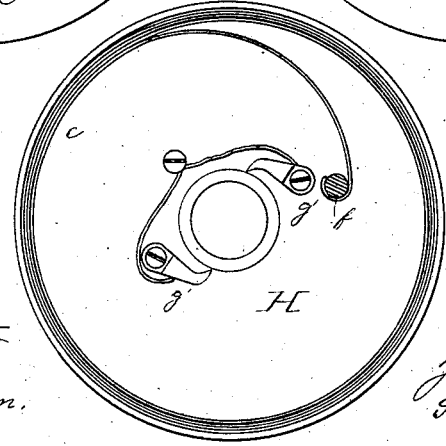
Figure 10:

In the accompanying drawings, Figure 1 represents an exterior perspective view of our lumber-measure; Fig. 2, a top view; Fig. 3, a bottom view. Fig. 4 shows a transverse section of the instrument; Fig. 5, a sectional plan of the index-plates on line $x$ $x$ in Fig. 4; Fig. 6, a bottom view of the plate that covers the index-disks; Fig. 7, a plan view of the index-disks; Fig. 8, a plan view of the driving-gears for changing the registering device to accommodate different lengths of boards to be measured; Fig. 9, a plan of the plate that carries the ratchet-wheel inside of the tape-line spool; Fig. 10, a sectional view of a set of the pinions that regulate the motion of the arbor and index-disks relative to the motion of spool and ratchet-wheel; and Fig. 11, a bottom view of the tape-line spool.

Like letters designate corresponding parts in all the figures.

The frame consists of four plates, A B C D. The plates A and B are connected by studs $a$ and the plates C and D by studs $a'$, and the entire frame is inclosed in a casing, E, having a cover, E'.

F is the central arbor, which is pivoted with its lower end in frame-plate D, passes through central openings in plates B and C, and has rigidly secured to its upper extremity the index-disk L. Upon this central arbor, F, between the plates B and C, is loosely sleeved a ratchet-wheel, G, which at its upper end has formed a trunnion that finds its bearing in plate B, while at its lower end this ratchet-wheel has a sleeve that projects through plate C and carries a spur-wheel, $b$.

Upon the upper end of ratchet-wheel G is pivoted the spool H, over which is wound the tape-line $d$.

To the inside of the rim of spool H is secured one end of a coiled spring, $e$, the other end of which is attached to plate C by a stud, $f$.

Two pawls, $g$, are pivoted to plate C diametrically opposite each other, so as to engage with the teeth of the ratchet-wheel G, and to allow such ratchet-wheel only to turn in one direction, and two similar pawls, $g'$, are pivoted against the central plate of spool H, also diametrically opposite each other, so as to engage with the teeth of ratchet-wheel G, and to rotate such ratchet-wheel with the unwinding of the tape-line, but not while the motion of the spool is reversed by the action of spring $e$.

Upon the lower end of arbor F is rigidly mounted a spur-wheel, $h$, which is somewhat smaller in diameter than wheel $b$, that is mounted upon the sleeve of ratchet-wheel G.

Four spindles, I I' I² I³, are pivoted between the plates C and D, and each carries two pinions. These spindles are placed around the central arbor, F, so that the lower pinions mounted thereon are in gear with the wheel $b$, while the lower pinions are in the plane of wheel $h$.

Two arms, J and J', extending in opposite directions, are loosely sleeved with one end upon the arbor F, between the gear-wheels $b$ and $h$, and their other or outward ends are bent to bear against the frame-disk D, and are guided under segmental cleats $i$. Each arm J J' has secured a stud, $j$, upon which is pivoted a spur-wheel, $k$, that is permanently in gear with wheel $h$, and is in the plane of the lower pinions on spindles I, I', I², and I³.

The heads of the studs $j$ project through diametrically-opposite slots in plate D and casing-cover E', which slots are sufficiently wide for the studs $j$ to move freely therein, and are notched in their middle and enlarged in their ends to admit of thimbles $l$, which are sleeved upon the studs $j$, and are pushed toward wheels $k$ by an intermediate spiral spring. Each thimble will lock the arm J or J', to which it is attached, in either one of the three positions in its slot—that is, in the middle one, when the wheel $h$ will be disengaged from the pinions on spindles I, I', I², or I³, or in either one of the end notches, when the wheel $h$ will be in gear with one of the pinions and will transmit motion from ratchet-wheel G to arbor F. The upper pinions, that mesh with wheel $b$ and are constantly in gear therewith, are all of one size, while the lower pinions, that are to engage with wheels $k$ and are to transmit motion to wheel $h$, are of different size and are calculated to register the number of superficial feet of different lengths of boards—viz., the smallest pinion for twelve-feet, the next for fourteen-feet, the next for sixteen-feet, and the largest pinion for eighteen-feet boards.

For locations where boards are cut or kept in market of more various lengths that are to be measured by this instrument, it can be arranged with six spindles, I, carrying pinions, and with three arms, J, carrying coupling-wheels $k$.

As stated before, the index-disk L, which bears the numbers for the units, is rigidly secured to the end of arbor F, so as to rotate therewith. This disk L rests upon the plate B and is saucer-shaped, with an annular rim that carries the figures.

M is a similar saucer-shaped index-disk that carries the figures for the tens, and is made sufficiently small to be placed inside of disk L upon an intermediate disk, $m$, and N is another index-disk still smaller than disk M, so as to be placed inside thereof. This disk N carries the figures for the hundreds, and is pivoted upon the hub of a disk, $n$. These intermediate disks, $m$ or $n$, are secured to the plate A by a screw, $o$, that is passed through such plate A and through the hub of disk $n$, and its point is screwed into the hub of disk $m$, and for the purpose of preventing such disks from changing their relative positions their hubs are coupled together and to the plate A by dowel-pins.

The disks M and N have to their periphery each ten teeth that are equally spaced, and the disks L and M have each a pawl, $p$ and $p'$. The pawl $p$ is to engage with one of the teeth of disk M whenever its tail end is brought in contact with and while it is moving inside of a segmental flange, $r$, that is fixed upon plate B, and which takes up in length about one-tenth of the periphery of an entire circle. The pawl $p'$ will engage with one of the teeth of disk N whenever its tail end comes in contact with and while it is moving inside of a segmental flange, $r'$, of stationary disk $m$, the length of which is also equal to about one-tenth of an entire circle. Either pawl $p$ or $p'$, after having passed such flange $r$ or $r'$, will be disengaged from the tooth of the disk by the action of a small spring.

With the above arrangement the disk L, with the last tenth part of each revolution, will rotate the disk M one-tenth part of a revolution, and the disk M, with the last tenth part of each revolution, will rotate the disk N one-tenth of a revolution, so as to register the tens and hundreds as they are reached with counting.

The disks M and N have each ten ratchet-teeth on their top faces also, which teeth engage with leaf-springs $s$ for holding these disks steady in their acquired position, and for preventing their being turned by the friction alone from one disk against the other.

An arm, O, is pivoted with one end upon the hub of disk $n$, and has two tubular projections, $t$, that extend through segmental slots in plate A and casing E. Each of these tubular projections forms a guide for a stem, $u$, which is pushed outward by a spiral spring sleeved upon such stem $u$, so that the stem will be flush with the bottom side of arm O, and with its top end extending beyond the top of the tubular projection $t$. Either one of these stems $u$ being depressed will engage with one of the teeth on top of disks M and N, and then by swinging the arm O such disk will be turned about one-tenth of a revolution, a coiled spring, $v$, drawing the arm O back again to its starting-point after each oscillation until the desired figure on the index-plate has been moved to the opening P. Through this opening P, which is covered by a glass plate for excluding the dust, the line of figures that constitute the number of superficial feet can be inspected.

The end of the tape-line $d$ projects through a slot in a protuberant or shoulder piece, $w$, that is attached to the side of casing E, and in one side of this slot is pivoted a roller, over which the tape-line is guided. This protuberance may be suitably shaped so as to form a shoulder to be placed against the edge of the board to be measured, and that it can be inserted into the crevice between two boards placed side by side, and a suitable handle may be connected to the casing for holding the instrument by the left hand while measuring boards by extracting the tape-line with the right hand.

For using this instrument we first determine the lengths of the boards to be measured and lock the thimble $l$ into the notch that shows the corresponding number for the length of the boards in feet. Next we turn back the index-disks M and N to show the figure 0 and the disk L by extracting the tape-line until the figure 0 thereon is in line. Now, by measuring the width of the boards with the tape-line one by one and by releasing the tape-line again after each measure the index-plates will register the exact and entire number of superficial feet of as many boards as have been measured up to one thousand, and without further calculations or memoranda.

As will be noticed, the construction and arrangement of the above-described lumber-measure is such that it is reliable in its performance and cannot well get out of order.

What we claim is—

1. In a lumber-measure, the combination of the tape-line spool H, having spring $e$ and pawls $g'$, the frame-plate C, with stud $f$ and pawls $g$, the arbor F, having spur-wheel $h$ rigidly mounted on the lower end, index-plate L, rigidly secured to the upper end of said arbor, the ratchet-wheel G, with gear-wheel $b$, and suitable coupling-gears for transmitting a variable motion from wheel $b$ to wheel $h$, all substantially as and for the purpose set forth.

2. In a lumber-measure, the arbor F, carrying index-disk L and spur-wheel $h$, both rigid therewith, the ratchet-wheel G, coupled with spool H by pawls $g'$, and having spur-wheel $b$, in combination with spindles I I' I² I³, each having mounted two pinions, and with arms J J, carrying coupling-wheels $k$, and arranged to be locked for engaging at either side with one of the pinions on spindles I for adjusting the speed of the index-plates to accommodate different lengths of boards to be measured, all substantially as and for the purpose set forth.

3. In a lumber-measure, the frame-plate B, having segmental flange $r$, the index-disk L, secured to arbor F and having pawl $p$, the stationary disk $m$, having segmental flange $r'$, the index-disk M, having pawl $p'$, and the index-disk N, both index-disks M and N being provided on their rim with ratchet-teeth that correspond with the figures on the faces, and each of said pawls having a tail end and being pivoted to cause said tail ends to come in contact with and travel along the segmental flanges, the whole being constructed and arranged substantially in the manner set forth.

4. In a lumber-measure, the plate B and the index-disks M and N, having ratchet-teeth to their upper faces, in combination with the plate A, having springs $s$, opening P, and arm O, with tubular extensions that carry spring-stems $u$, all substantially as and for the purpose set forth.

In testimony that we claim the foregoing as our invention we affix our signatures in presence of two witnesses.

JOSEPH H. PERRY.
SAMUEL A. GOODMAN.

Witnesses:
F. W. KASEHAGEN,
W. C. ADAMS.